Dec. 2, 1969    R. C. HEACOCK ET AL    3,481,049
FISH MEAL ROTARY DRYER
Filed April 11, 1968    3 Sheets-Sheet 1
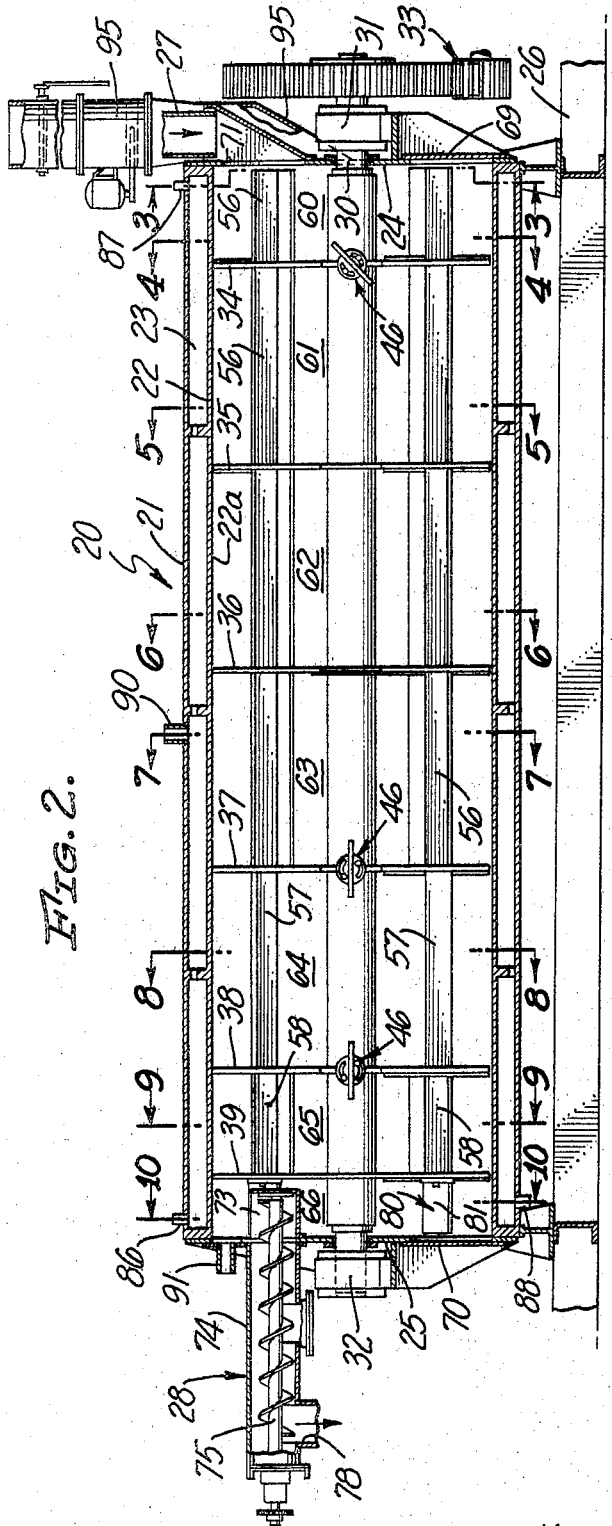
INVENTORS
ROY C. HEACOCK,
WESLEY B. DYER
BY THEIR ATTORNEYS
HARRIS, KIECH, RUSSELL & KERN INVENTORS
ROY C. HEACOCK,
WESLEY B. DYER
BY THEIR ATTORNEYS
HARRIS, KIECH, RUSSELL & KERN

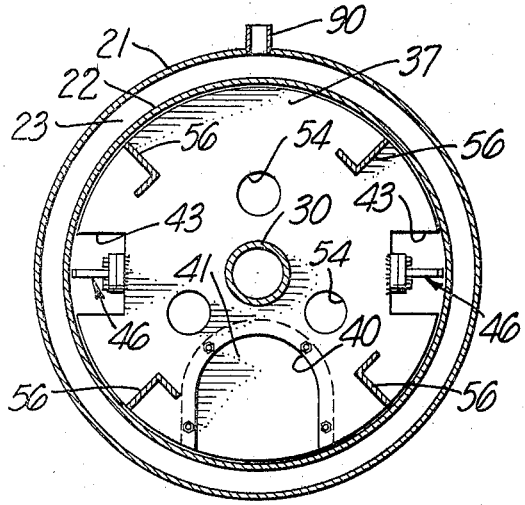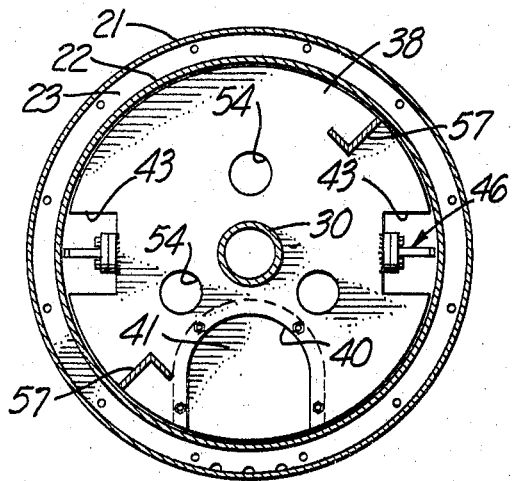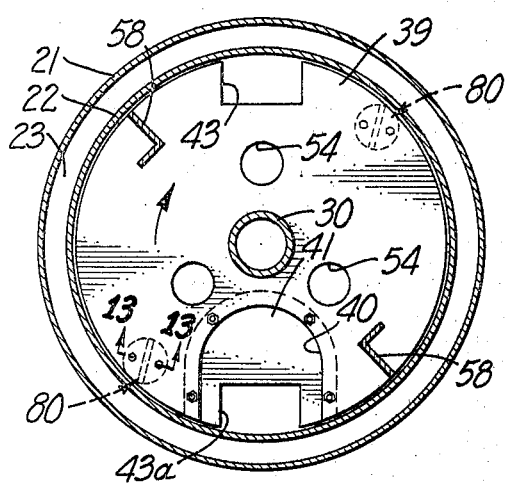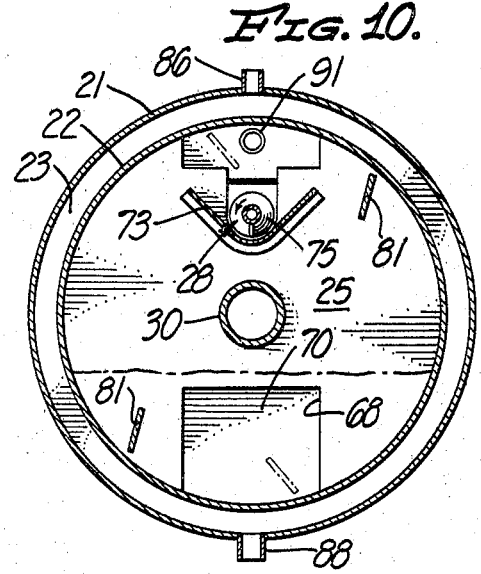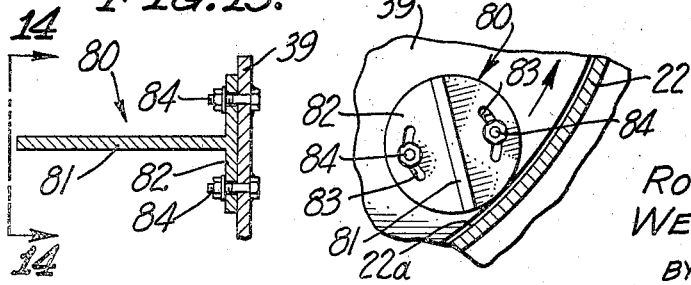

United States Patent Office 3,481,049
Patented Dec. 2, 1969

1

3,481,049
FISH MEAL ROTARY DRYER
Roy C. Heacock, Whittier, and Wesley B. Dyer, Pasadena, Calif., assignors to Standard Steel Corporation, Los Angeles, Calif., a corporation of California
Filed Apr. 11, 1968, Ser. No. 720,550
Int. Cl. F16b 17/20, 15/26
U.S. Cl. 34—109                            4 Claims

ABSTRACT OF THE DISCLOSURE

A generally horizontal, rotary dryer having a steam jacket around a shell containing a rotatable shaft having disks spaced therealong to separate the shell into compartments, with port means in the disks for providing communication between the compartments, and lifting means on the disks for lifting material to be dried and moving it along the interior of the shell in heat-exchanging relation thereto, with means for supplying material to be dried to one end of the shell and discharging dried material from the other end of the shell.

SUMMARY OF THE INVENTION

Figure 3:
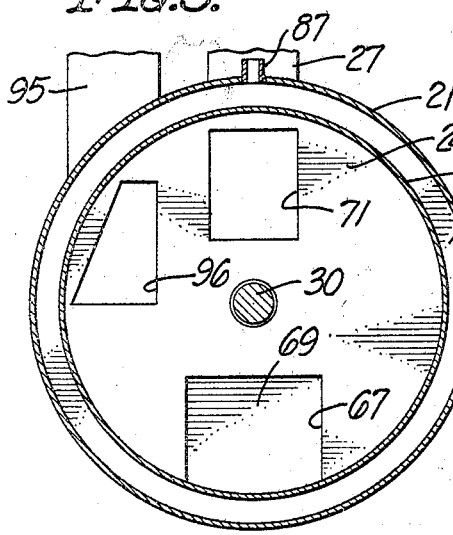

Generally horizontal rotary dryers, for drying fertilizer, and the like, are old in the art, as illustrated by the patent to Hamler, Re. 15,362, issued May 23, 1922.

The present invention relates to a dryer particularly adapted to dry cooked or raw fish material to produce a dried fish meal, and will be described in connection therewith, although it is also adapted to dry other products, such as, for example, vegetable waste, meat, poultry scrap, scrap, feather meal, and the like.

The present invention includes a generally horizontal stationary cylindrical shell having a steam jacket therearound in heat-exchange relation therewith, the shell sloping slightly from an inlet end to a discharge end, with hopper means at the inlet end for feeding wet material into the shell and discharge means at the discharge end of the shell for discharging dried material therefrom. It also includes a main rotary shaft extending axially through the shell, with means external of the shell for rotating the shaft. It also includes a plurality of generally circular disks rigidly mounted on the shaft and spaced apart therealong to form a series of compartments in the shell, with material openings in the periphery of each disk to provide communication between adjoining compartments for the passage therebetween of the material being dried, it may include control means in at least some of the material openings to adjustably control the passage of the material therethrough, and it may include separate air openings in each of the disks to permit the passage of drying air longitudinally through the shell. It includes a plurality of paddle rails extending between the disks and substantially the length of the shell, the rails being disposed at or adjacent to the periphery of the disks and being adapted to lift the material being dried from the lower portion of the shell, wipe it along the inner surface of the shell in heat-exchange relation therewith and to then drop such material from the upper to the lower portion of the shell, the rails scraping the inner surface of the shell to keep it clean of the material. It also includes means for adjustably controlling the rate of discharge of the dried material from the shell, as well as the rate of passage of the material longitudinally through the shell. It also, preferably, includes means whereby at the discharge end of the shell the dried material is lifted within the shell and dropped into a discharge located in the upper portion of the shell.

2

It is a primary object of this invention to provide a dryer in which the rate of passage therethrough of a material to be dried can be varied as desired to insure a desired degree and rate of drying of the material.

A difficulty commonly experienced with conventional dryers is that the material being dried, particularly fish material, commonly passes through a "glue" stage in which it tends to adhere to the interior of the shell of the dryer, necessitating frequent shut-downs for cleaning. It is a further object of this invention to provide a dryer which obviates such difficulty by better mixing of the material and by constant scraping the interior of the shell to prevent adherence of the material thereto.

Other objects and advantages of the invention will appear from the following disclosure, which is for the purpose of illustration only.

DISCLOSURE

Figure 4:
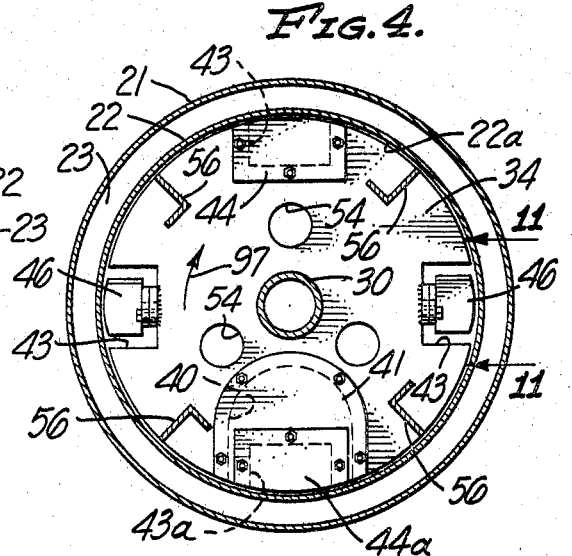
Figure 5:
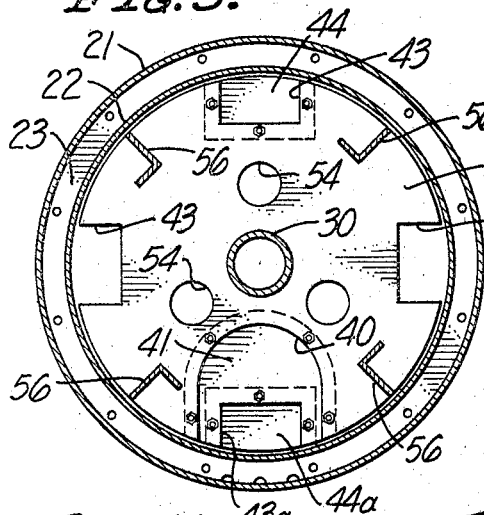
Figure 6:
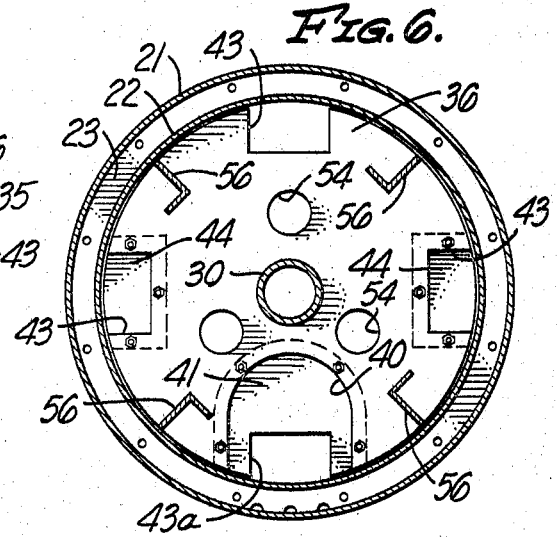
Figures 11, 12:
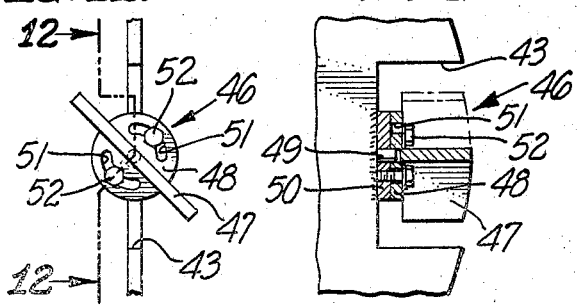

Referring to the drawings:
FIG. 1 is a plan view of the dryer of this invention;
FIG. 2 is a vertical elevational section on the line 2—2 of FIG. 1;
FIG. 3 is a cross-section on the line 3—3 of FIG. 2;
FIG. 4 is a cross-section on the line 4—4 of FIG. 2;
FIG. 5 is a cross-section on the line 5—5 of FIG. 2;
FIG. 6 is a cross-section on the line 6—6 of FIG. 2;
FIG. 7 is a cross-section on the line 7—7 of FIG. 2;
FIG. 8 is a cross-section on the line 8—8 of FIG. 2;
FIG. 9 is a cross-section on the line 9—9 of FIG. 2;
FIG. 10 is a cross-section on the line 10—10 of FIG. 2;
FIG. 11 is a fragmentary view as indicated by the arrows 11—11 of FIG. 4;
FIG. 12 is a view on the line 12—12 of FIG. 11;
FIG. 13 is a sectional view on the line 13—13 of FIG. 9; and
FIG. 14 is a view as indicated by the arrows 14—14 of FIG. 13.

Referring to the drawings, FIGS. 1 and 2 show a dryer 20 which includes an outer cylindrical shell 21 and a concentric inner cylindrical shell 22, spaced apart to form an annular steam jacket 23 therebetween. The dryer 20 is generally closed at its inlet end by an end plate 24 and at its outlet end by an end plate 25, and the dryer is rigidly mounted on an appropriate supporting base 26 so that the inlet end is slightly higher than the outlet end, although the dryer is substantially horizontal. Rigidly mounted on the end plate 24 is an inlet hopper 27, and mounted on the end plate 25 is a discharge means 28.

Extending through the inner shell 22 is a rotatable shaft 30 which is journalled in bearings 31 and 32 appropriately mounted on or relative to the end plates 24 and 25, respectively, and the shaft 30 is connected by suitable reduction gearing 33 to the drive shaft of a motor or other power source 33a adapted, upon energization, to rotate the shaft.

Rigidly mounted on the shaft 30 are generally circular disks 34 to 39, inclusive, which are spaced apart longitudinally along the shaft, the periphery of each of such disks having only a small clearance with the inner surface 22a of the inner shell 22. Each of such disks has a semicircular manhole opening 40, all of which are normally plugged by removable plates 41, the manholes being large enough to permit access longitudinally through the dryer for the purpose of cleaning or otherwise. Each of such disks is provided in its periphery with a plurality of notches 43, some of which are closed by detachable plates 44. In some of the removable plates 41 similar notches 43a are provided, some of which are closed by detachable plates 44a. Some of the notches 43 are provided with rotatable fins 46, which together with their associated notches serve as valve means as hereinafter described, the details thereof being shown in large fragmentary figures 11 and 12. Each of such fins includes a fin member 47 mounted on a circular plate 48 journalled on a stub shaft 49 mounted in a circular plate 50 welded or otherwise secured to its associated disk, each of the plates 48 having a pair of semicircular slots 51 through each of which extends a bolt 52 threaded into the circular plate 50. By loosening such bolts, the fin member 47 may be rotated to a desired position in its cooperating notch 43 following which the bolts 52 may be tightened to retain the fin member in such desired position, for the purpose described hereinafter. As shown in FIGS. 4 to 9, inclusive, each of the disks is provided with three circumferentially spaced air holes 54 adjacent to the rotatable shaft 30, although such air holes may be omitted if desired.

Extending through the disks 34, 35, 36, and 37 are longitudinal rails 56, each of which is in the form of an angle iron and serves as a scraper and lifter as hereinafter described. Between the disks 37 and 38 are only a single diametrically spaced pair of such rails 57, and between the disks 38 and 39 are only a single pair of such rails 58 each of which is disposed midway between the line of the corresponding rails 57. All of such rails have a leg extending to the periphery of the associated disks so as to be disposed adjacent to the inner surface 22a of the inner shell 22 to serve as scrapers to scrape material therefrom and to lift the material to be dried, wiping it along the inner surface 22a. Such disks divide the dryer 20 longitudinally into compartments 60 to 66, inclusive. The end plates 24 and 25 are provided with ingress and egress openings 67 and 68, respectively to provide ingress and egress from the interior of the dryer for cleaning purposes or otherwise, and are normally closed by detachable cover plates 69 and 70, respectively. As illustrated in FIGS. 2 and 3, the inlet hopper 27 communicates with the inlet compartment 60 through an opening 71 in the end plate 24.

As best shown in FIGS. 2 and 10, secured to the upper portion of the outlet end plate 25 and disposed in the compartment 66 is a trough 73 which forms part of the discharge means 28. The discharge means 28 also includes a shell 74 suitably secured to the end plate 25 and extending outwardly therefrom, the shell containing a helical screw conveyor 75 adapted to be rotated in the direction of the arrow shown in FIG. 10 by a suitable power source 76 connected thereto. The shell 74 is provided with a downwardly extending discharge opening 78.

The disk 39 has a pair of adjustable lifters 80, as best shown in FIGS. 9, 13, and 14. Each of the lifters 80 includes a lifting paddle 81 attached to or integral with a circular plate 82 having a pair of semicircular slots 83, each plate being secured to the disk 39 by a nut and bolt assembly 84 extending through one of the slots. By loosening the nut and bolt assemblies 84 the plate 82 may be rotated relative to the disk 39 to change the angle of the lifting paddle 81 with respect thereto and to change the clearance of the lifting paddle with the interior surface 22a of the inner shell 22, following which the nut and bolt assembly may be tightened to retain the lifting paddle in such desired position.

The outer shell 21 is provided with vent ports 86 and 87 for venting air and non-condensible gases from the steam jacket 23. The shell 21 is also provided in the bottom of the discharge end of the dryer 20 with a discharge port 88 through which condensate forming in the steam jacket 23 may be removed from the dryer to a point of disposal (not shown). As shown in FIGS. 2 and 7, the dryer 20 is also provided with a steam inlet port 90, about midway along the length thereof, through which steam from a suitable source (not shown) may be conducted into the steam jacket 23 for heating the inner shell 22 and material therein. Communicating with the interior of the inner shell 25, at its discharge end, is an auxiliary hot air port 91 connected to a suitable source of hot air (not shown), and through which hot air can be introduced into the dryer to assist in the drying operation.

Also rigidly connected to the inlet end plate 24 is an exhaust hood 95 which communicates with the compartment 60 through an opening 96 in the end plate, the exhaust hood being for the purpose of exhausting from the dryer water vapor and heating air, if the latter is employed, in the drying operation.

The dryer 20 is particularly adapted to the drying of raw materials such as fish waste, including fish heads, tails, scrap and offal, and trash fish such as ribbon fish, anchovies, mackerel, and others, and a combination thereof. In the making of fish meal from such fish waste and trash fish, the raw material is usually first cooked and pressed in suitable conventional equipment, or such preliminary cooking and pressing may be omitted if desired, and is then fed through the inlet hopper 27 into the compartment 60 of the dryer 20, from which it passes sequentially through the compartments 61, 62, 63, 64, 65, is lifted by the lifters 80 and dropped into the trough 73 from which it is carried from the dryer by the screw conveyor 75 and discharged through the discharge opening 78 into suitable equipment for conventional further processing, such as grinding and sacking.

Prior to operation, the dryer 20 is first heated up by introducing steam into the steam jacket 23 until the inner shell 22 has attained a desired relatively high temperature. The power source 33a is then energized to rotate the shaft 30 and the disks 34 to 39, inclusive, thereon in the direction of the arrow 97 in FIG. 4. The power source 76 is also energized to rotate the helical conveyor screw 75. The material to be dried is then delivered to the inlet hopper 27 and is discharged therefrom through the opening 71 into compartment 60, in which it is lifted and wiped along the inner surface 22a of the inner shell 22 until it slides off the lifters and drops back to the lower portion of the shell, during which it is heated by its heat exchange relation to the inner shell to evaporate liquids from the material. Due to the downward slope of the dryer 20 from inlet to outlet end thereof, and due to the weight of material in the compartment 60, partially dried material therein works its way through the notches 43 of the disk 34 into the compartment 61 in which it is similarly lifted and wiped along the walls of the inner shell 22 and from which it sequentially works its way through similar notches 43 in the disks separating the various compartments, from compartment to compartment until it arrives in the discharge compartment 66, at which time it will be fully dried to a desired dryness. In the compartment 66 the material is lifted by the lifting paddles 81 and dropped into the trough 73 from which it is carried out of the dryer by the discharge means 28.

Normally, in operation the dryer 20 is not filled with material being dried to a level above the shaft 30, although the level of such material may vary somewhat from compartment to compartment. The degree of drying of the material may be controlled by varying the rate of passage of the material lengthwise through the dryer and by varying the rate of withdrawal of the dried material from the dryer. In other words, the dryness of the material is controlled by controlling the time that the material is retained in the dryer. The rate of passage of the material lengthwise through the dryer 20 may be varied by varying the angular setting of all or some of the fins 46 relative to their associated disks. The rate of withdrawal of the dried material from the dryer 20 may be regulated by adjusting the angular positions of the lifting paddles 81 relative to the disks 39, which varies the rate at which dried material is lifted by the paddles and dropped into the trough 73, or by adjusting the rotational speed of the screw conveyor 75, or by both. Such adjustments are readily made by the operator until the desired dryness of the material discharged through the discharge opening 78 is attained, and thereafter, so long as the moisture content of the wet material fed to the dryer 20 through the inlet hopper 27 does not change substantially. The longitudinal rails 56, which scrape along the inner surface 22a of the shell 22 during operation, maintain such inner surface clean and free from the material being processed. At high feed rates it may be necessary to feed hot air through the port 91 for additional drying of the material, such hot air passing in from the port 91 through the dryer and the material therein, countercurrent to the flow of such material having unimpeded passage lengthwise through the dryer through one or more of the air holes 54 in each disk, and this is a feature of the invention.

The interior of the dryer 20 may be cleaned readily by removing the cover plates 69 and 70 and, if desired the detachable plates 44 and 44a, following which the interior of the dryer may be flushed out with water or hand scraped by an operator.

We do not intend to be limited to the preferred embodiment shown and described, but desire to be afforded the full scope of the following claims.

We claim:
1. In a rotary dryer, the combination of:
a generally horizontal cylindrical shell, having an inlet opening at one end and a discharge opening at the other end;
a steam jacket over a major portion of the exterior of said shell;
means for supplying steam to said steam jacket;
a rotary shaft extending through said shell and coaxial therewith;
means for rotating said shaft;
a plurality of circular disks fixed to said shaft and spaced apart along the length of said shaft, the periphery of each of said disks having only a small clearance from the interior of said shell,
each of said disks having a notch in its periphery,
at least one of said disks having means for varying the effective area of its notch; and
longitudinal lifter means extending between each pair of said disks and fixed relative thereto adjacent the periphery thereof, adapted to lift material in said shell and wipe it against the interior of said shell.

2. A dryer as defined in claim 1, in which each of the disks is provided with a plurality of openings therethrough, disposed inwardly of its notch, and the dryer having means for supplying drying air to said shell and longitudinally therethrough and through said openings, to assist in drying material in said shell.

3. A dryer as defined in claim 1, in which each of the disks has a pair of said notches diametrically disposed in its periphery.

4. A dryer as defined in claim 2, in which the openings in each disk are so disposed that at least one of such openings has at least a portion of its area above the shaft in all rotational positions of the disk, to insure the continuous free flow of drying air longitudinally through the shell.

References Cited

UNITED STATES PATENTS

| Re. 15,362 | 5/1922 | Hamler | 34—82 |
| 1,571,703 | 2/1926 | Butzbach | 34—109 |

LLOYD L. KING, Primary Examiner